Oct. 18, 1932. E. H. J. C. GILLETT 1,882,805
TRANSMISSION SYSTEM
Filed July 22, 1929 2 Sheets-Sheet 2

INVENTOR
E.H.J.C.GILLETT
BY
Wilkinson & Huxte
ATTORNEYS

Patented Oct. 18, 1932

1,882,805

UNITED STATES PATENT OFFICE

EDWARD HENRY JAMES CECIL GILLETT, OF MAIDA VALE, LONDON, ENGLAND

TRANSMISSION SYSTEM

Application filed July 22, 1929, Serial No. 380,105, and in Great Britain August 3, 1928.

The present invention relates to improvements in transmission systems for automobiles, and has for an object to provide an improved transmission system in which the engagement and disengagement of the clutch is accomplished automatically, relieving the driver of the work associated with clutch operation.

Another object of the invention is to provide an improved transmission system in which the engagement of the clutch is rendered smooth and progressive independently of the skill of the driver.

A further object of the invention resides in providing an improved transmission system in which gear changing can be carried out easily and quietly without the exercise of judgment on the part of the driver.

The accompanying drawings illustrate by way of example one constructional form of the present invention, as applied to a motor vehicle transmission.

Fig. 5 is a diagrammatic view showing the assembly of the clutch together with an engine and variable speed gear in the transmission system of a motor vehicle.

Figure 1:
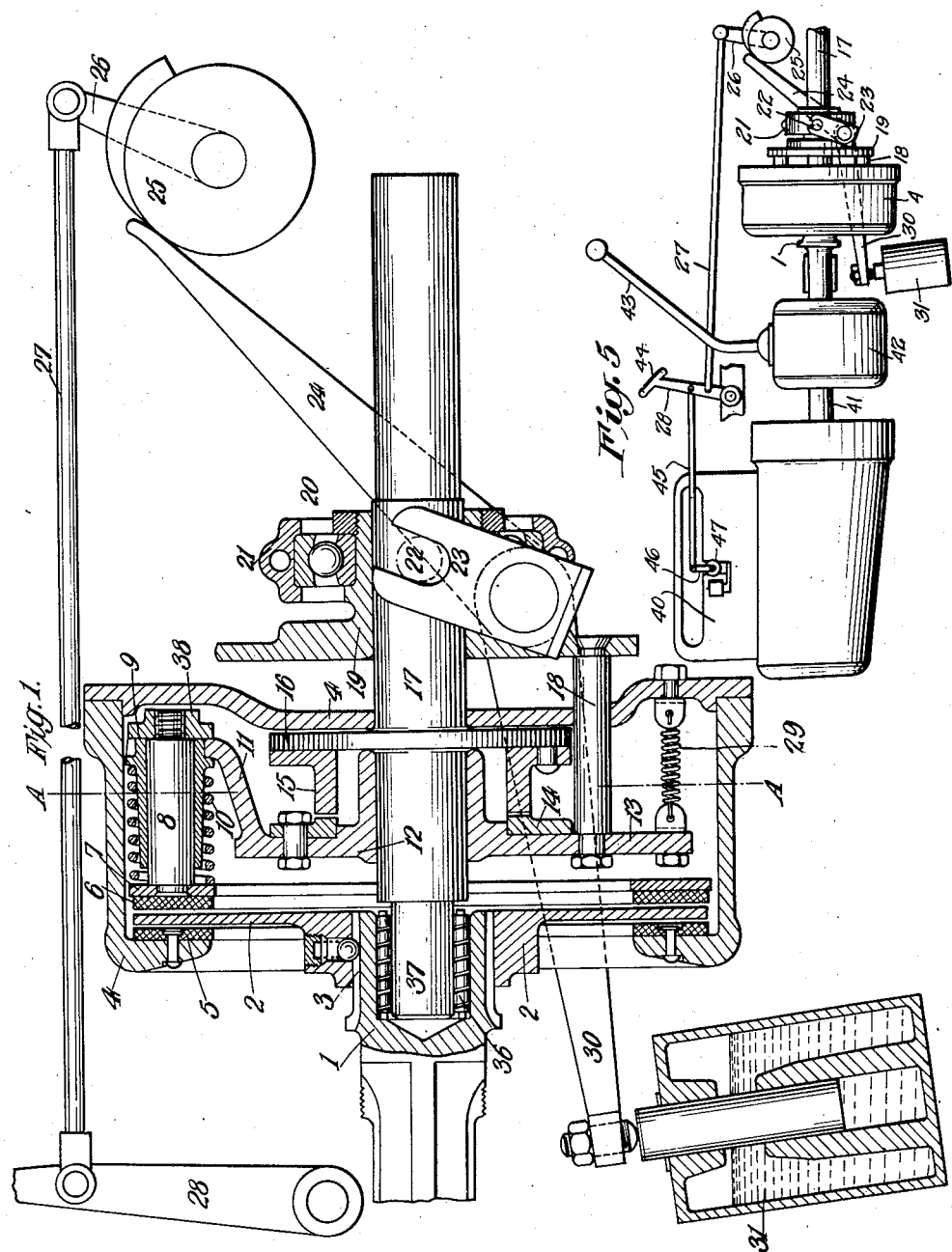
Fig. 1 is a longitudinal section of the clutch along the centre line.

In referring to the drawings it will be taken that the clutch is mounted in rear of the change speed gear box.

Figure 3:
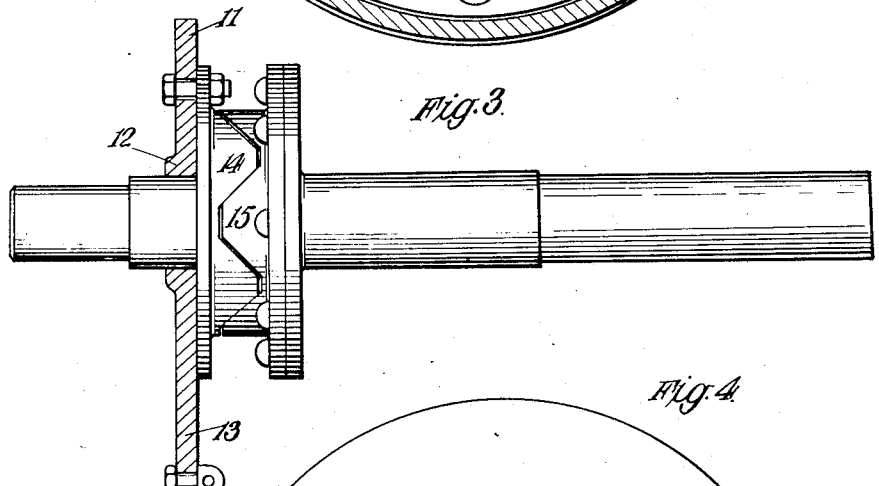
Fig. 3 is a side elevation of the V-shaped dog clutch.

1 is a shaft transmitting the drive from the gear box. On this shaft 1 is slidably splined a sleeved disc 2. 17 is the driven shaft transmitting the power to the final drive. The end 37 of shaft 17 is supported in a recess in the end of shaft 1 by means of a roller bearing 36. Integral with shaft 17 is a flange 16, to which is rigidly fixed the dog clutch member 15, adapted for engagement with a corresponding member 14, the engaging faces being V-shaped and inclined at 45 degrees to the centre line of shafts 1 and 17. The shape and inclination of the engaging faces are shown in Fig. 3. The dog clutch element 14 is rigidly fixed to a sleeve 12, rotatably and slidably mounted on the shaft 17. The sleeve 12 carries a series of radial arms 11 and 13, and is attached by studs 18 to a sleeve 19 rotatably and slidably mounted on the shaft 17.

The arms 11 act by means of the nut 38 and studs 8, and the sleeves 9 and springs 10 on the annular plate 7. The outer rim of the disc 2 lies between faces made of suitable friction material 5 and 6. The facing 5 is fixed to the casing 4 and the facing 6 to the annular plate 7. The studs 18 pass through holes in the casing 4.

In order to avoid repetition the remaining parts of the mechanism will be described in conjunction with the operation of the device, which is as follows:—

The depression of an engine accelerator pedal or other control member 28 operates cam 25 by means of a rod 27 and a lever 26. The cam 25 raises a lever 24 which carries a forked arm 23 and a lever 30. The lever 30 works against an oil dash pot which does not resist the first part of the motion, but comes into action after the friction faces 5, 6 and 2 are lightly engaged and prevents "snatch". The forked arm 23 engages with trunnions 22 which are mounted on the ring 21, carrying a self aligning ball bearing 20, by which the movement of the trunnions 22 and ring 21 is communicated to the sleeve 19, and thence, by means of the studs 18 to the sleeve 12 which is caused to slide on the shaft 17. This movement is communicated by the arms 11 to the sleeves 9 and the springs 10, thus bringing the friction facing 6 on the annular plate 7 into contact with the disc 2. The disc 2 being free to slide longitudinally on the shaft 1 is brought into contact with the friction facing 5 on the casing 4.

The rotation of the shaft 1 and the disc 2 is thus communicated to the casing 4 and the annular ring 7 and so, by means of the studs 8 and the arms 11, to the sleeve 12. As soon as sleeve 12 starts to rotate, the inclined faces of the dog clutch elements 14 and 15 are brought into contact and rotation is transmitted to the shaft 17 by means of the flange 16. Since the dog clutch elements 14 and 15 have two sets of faces inclined in either direction from the axis of shafts 1 and 17, this action will take place with rotation commencing in either sense. The resistance to rotation offered by the shaft 17 effects a wedging action between the inclined faces of 14 and 15. This wedging action acting through the sleeve 12, arms 11 and sleeves 9 compresses the springs 10, thus bringing the faces 5 and 6 and the disc 2 into progressively firmer engagement until the drive is fully taken up, the dash pot 31 ensuring smooth engagement.

When the accelerator pedal is released, the pressure on the sleeve 12, due to the train of elements 25, 24, 23, 22, 21, 20, 19, 18, is withdrawn, and the sleeve 12 is brought back to its initial position by springs 29 acting on the arms 13 of the sleeve 12. The springs 29 are attached at one of their ends to the arms 13 and at their other ends to the casing 4. The arms 11, acting in the reverse direction by means of the nuts 38 and the studs 8, withdraw the annular plate 7 with its friction face 6 from contact with the disc 2, thus freeing the mechanical connection between the shafts 12 and 17.

The cam 25 is formed with a leading part of increasing radius and a longer trailing part of constant radius, so that the lever 24 experiences the full lift of the cam when the lever 26 has been rocked through a short distance (from right to left as shown in Fig. 1), further rocking of the lever 26 having no further action on the lever 24. The total lift of the cam is just sufficient to bring the friction faces 5, 6 and 2 into light engagement without appreciably compressing the springs 10. When the latter are compressed by the wedging action of the inclined elements 14, 15, the elements 18, 19, 21, 22 and 23 are brought further to the left (as seen in Fig. 1), and the lever 24 is lifted clear of the cam 25 altogether.

Figure 2:
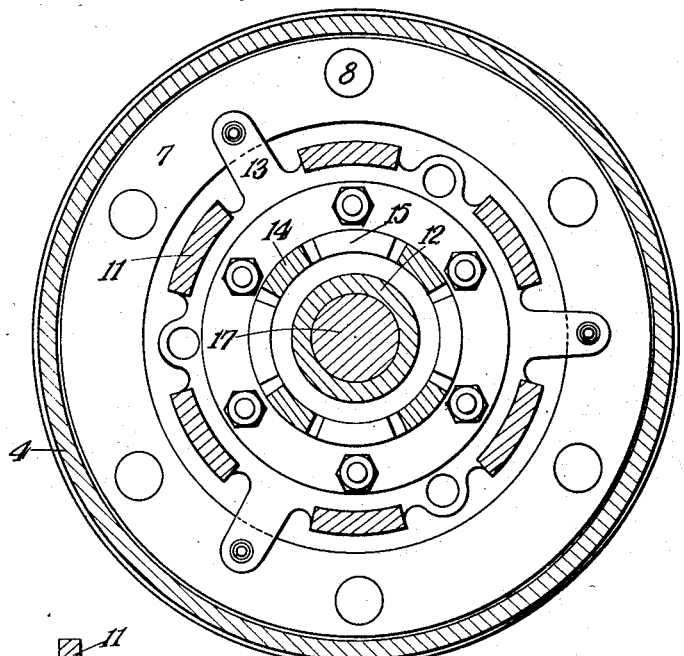
Fig. 2 is a cross section on the line AA in Fig. 1 omitting certain parts for the sake of clarity.
Figure 4:
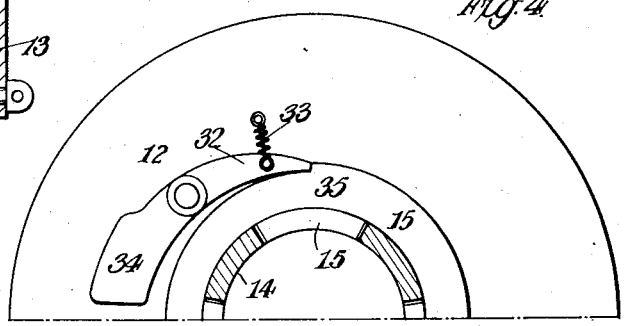
Fig. 4 is a cross section showing the pawl mechanism for preventing the engagement of the clutch when the reverse gear is engaged and the driven shaft is not stationary.

Referring to Fig. 4:—32 is a pawl pivoted to the member 12 (Figs. 1 and 2) and adapted to engage with a notch 35 in the member 15. Normally, the pawl 32 is held out of engagement by the spring 33, but when the member 12 is rotating at more than a very low speed, the centrifugal force on a bob weight 34 which is integral with the pawl 32 overcomes the tension of 33 and causes the pawl 32 to engage the notch 35, thus preventing the inclined faces of 14 and 15 which transmit the drive in the reverse direction from coming into contact, and making it impossible to engage the clutch in the reverse direction except when the driven shaft 17 and the parts associated therewith are stationary.

Referring to Figure 5, 40 is the engine of a motor vehicle whose crank shaft 41 is directly coupled to the driving shaft of a variable speed gear 42, the gear change lever being shown at 43. The driven shaft of the variable speed gear is directly coupled to the driving shaft of a clutch as illustrated in Figs. 1 to 4, the driving shaft being shown at 1, the driven shaft at 17 and the casing at 4. The reference numbers 18, 19, 20, 21, 22, 23, 24, 25, 26, 27, 30 and 31 have the same signification as in Fig. 1 and no further description of them is necessary. The lever 28 which actuates the rod 27 is provided with a pedal 44 and is also coupled by means of the rod 45 and lever 46 to the throttle of a carburetor 47, the throttle being arranged in the normal manner to open when the pedal 47 is pushed forward.

Although I have illustrated and described the invention in connection with the use and operation of an accelerator pedal, it will be understood that the automatic clutch may be equally well controlled by another pedal separate and distinct from the accelerator or by some other control member.

What I claim is:—

1. In a motor vehicle having an engine accelerator, the combination with a self-energizing clutch of means operated by the accelerator and adapted to effect light engagement only of the clutch on first accelerating the engine, the said clutch comprising a movable idle member, two sets of co-acting inclined members, one set fast on the driven shaft and the counterpart set fast on the idle member, clutch disengaging springs and frictional elements between the driving shaft and the idle member and the said operating means comprising a mechanical connection between the accelerator and the idle member including a lost motion device, the operation being such that on lightly engaging the friction members a wedging action is set up between the said co-acting inclined members which effects tight engagement of the clutch, disengagement being effected on decelerating the engine, while the said lost motion device permits of further engine acceleration after the clutch is engaged without further effect on the clutch.

2. The motor vehicle transmission system in accordance with claim 1 and including cushioning means cooperating with the idle clutch member to render the engagement of the friction elements smooth and progressive.

3. A motor vehicle transmission system in accordance with claim 1 and including compression springs arranged between the idle clutch member and the friction elements in such a manner that the movement of the idle members to engage the clutch compresses the said springs wihch in turn force the friction members into engagement.

4. A motor vehicle transmission system in accordance with claim 1 and including a dashpot damping device operatively connected to the idle clutch member for the purpose of eliminating "snatch" in engagement.

5. In a motor vehicle the combination with a transmission system in accordance with claim 1 wherein the coacting inclined members are capable of transmitting rotation in either direction, of a device for preventing the engagement of the coacting inclined members for transmitting reverse drive which device is normally held inoperative by spring means which are overcome above a predetermined speed by centrifugal means to render the said device operative to prevent reverse drive.

6. A motor vehicle transmission system in accordance with claim 1 and wherein the coacting inclined members are in the form of V-shaped dogs having their coacting faces substantially at 45° to the common axis of the driving and driven shafts.

7. In a motor vehicle the combination with a transmission system in accordance with claim 1 wherein the coacting inclined members are capable of transmitting rotation in either direction of a device consisting of a notch in a member fast on the driven shaft and a counterweighted pawl pivoted on the movable idle clutch member and normally held out of engagement with the said notch by spring means, the force of which is overcome by the centrifugal force of the counterweight when the idle member exceeds a predetermined speed, thus allowing the said pawl to engage with the said notch, the pawl and notch being operative in a direction which prevents the engagement of the coacting inclined members which transmit reverse drive.

8. A motor vehicle transmission system in accordance with claim 1 including a dashpot damping device operatively connected to the idle clutch member, the said dashpot device being so arranged that no resistance is opposed to the movement of the said idle clutch member until the friction members are lightly engaged, further movement to effect tight engagement being resisted by fluid friction so that such tight engagement is effected smoothly and without "snatch".

9. A motor vehicle transmission system in accordance with claim 1 having a mechanical connection between the accelerator and the idle clutch member incorporating a lost motion device consisting of a cam operatively connected with the said accelerator and a lever operatively connected with the said idle clutch member and adapted to co-operate with the said cam the last part of whose profile to operate is a circular arc, so that the first movement of the accelerator in accelerating the engine rocks the said lever sufficiently to effect light engagement of the clutch only and further movement does not effect any further movement of the lever.

10. In a motor vehicle having an engine accelerator the combination of a cam operated by the accelerator and having a leading portion of increasing radius and a further portion of constant radius, a lever adapted to be rocked by said cam, an oil dashpot adapted to cushion the movement of such lever when it is lifted clear of the said cam altogether, a driving friction clutch member, a driven clutch member idle on the driven shaft and adapted to be moved axially towards the driving member by the said lever, and carrying a friction element axially slidable thereon, spring means tending to move the said driven clutch member axially away from the said driving member, compression springs between the driven clutch member and its friction element, two sets of co-acting V-shaped dogs one fast on the idle driven clutch member and one fast on the driven shaft and a pawl and ratchet device whereof the ratchet is fast on the driven shaft and the pawl is pivoted on the idle driven clutch member and centrifugally counterweighted to effect engagement with the said ratchet and held out of engagement below a predetermined speed by spring means, the operative direction of pawl and ratchet being such that when engaged they prevent the engagement of those faces of the V-shaped dogs which transmit reverse drive.

11. In a motor vehicle the combination of a transmission system in accordance with claim 1 and variable speed gearing located between the engine and the accelerator-controlled self-energizing clutch.

12. In a motor vehicle the combination with variable speed gearing of a transmission system in accordance with claim 1 and including cushioning means cooperating with the idle member of the clutch to render the engagement of the friction elements smooth and progressive, the said variable speed gearing being located between the engine and the driving clutch member.

13. In combination with a motor, an accelerator and a clutch, means biasing the clutch to disengaged position, clutch-engaging means, and control means for said clutch-engaging means coupled to the accelerator and operable therefrom to bring about engagement of the clutch through said clutch-engaging means and to suspend the operation of the clutch-engaging means to enable the clutch to be disengaged by said biasing means.

14. In a motor vehicle, the combination with a motor, a clutch, and means controlling the operation of the vehicle, of means biasing the clutch to disengaged position, clutch-engaging means, and control means for said clutch-engaging means operable in conjunction with said first mentioned controlling means to bring about engagement of the clutch through said clutch-engaging means and suspend the operation of the clutch-engaging means to enable the clutch to be disengaged by said biasing means.

15. In a motor vehicle transmission system, means controlling the operation of the vehicle a clutch biased to disengage position, clutch-engaging means, and means operable in conjunction with said first mentioned controlling means for controlling said clutch-engaging means to engage the clutch and permit its disengagement.

16. In a motor vehicle having an engine accelerator, the combination with a clutch and means normally holding said clutch out of engagement, of clutch-engaging means for engaging said clutch, and means operatively connected to the accelerator for bringing the clutch-engaging means into action to engage the clutch on accelerating the engine.

17. In a motor vehicle having an engine accelerator, the combination with a clutch involving driving and driven members and means for holding the clutch normally disengaged, of clutch-engaging means for engaging the clutch and permitting of disengagement when the driven member overruns the driving member, and means operatively connected to said accelerator for bringing the clutch engaging means into action to engage the clutch on accelerating the engine.

18. In a motor vehicle having an engine accelerator, the combination with a clutch and clutch-disengaging springs, of clutch engaging means to engage said clutch, and means operatively connected to the accelerator for bringing said clutch-engaging means into action to engage the clutch on first accelerating the engine including a lost motion device permitting further acceleration of the engine after the clutch-engaging means has engaged the clutch.

19. In a motor vehicle, an internal combustion motor, an accelerator for controlling said motor, a friction clutch, means biasing the friction clutch to disengaged position, progressively-acting clutch-engaging means for engaging said clutch, and means operatively connected to the accelerator for bringing the clutch-engaging means into action to engage the friction clutch on accelerating the motor and permitting the disengagement of the clutch on decelerating the motor.

20. In a motor vehicle, the combination with an internal combustion motor, a friction clutch, and means controlling the operation of the vehicle, of means biasing the friction clutch to disengaged position, clutch-engaging means, and control means for said disengaging means operable in conjunction with said first-mentioned controlling means to bring about engagement of the friction clutch through said clutch-engaging means and suspend the operation of the clutch-engaging means to enable the friction clutch to be disengaged by said biasing means.

21. In a motor vehicle transmission system, means controlling the operation of the vehicle, a friction clutch biased to disengaged position, means for progressively engaging said friction clutch, and means operable in conjunction with said first-mentioned controlling means for controlling the clutch-engaging means to engage the friction clutch and permit its disengagement.

22. In a motor vehicle transmission system, means controlling the operation of the vehicle, a variable speed gear, a friction clutch located adjacent said variable speed gear, spring means biasing the friction clutch to disengaged position, means for progressively engaging said friction clutch, and means operable in conjunction with said first-mentioned controlling means to engage the friction clutch and permit its disengagement.

EDWARD HENRY JAMES CECIL GILLETT.